(12) United States Patent
Littleford

(10) Patent No.: US 10,288,468 B2
(45) Date of Patent: May 14, 2019

(54) MONITORING STRUCTURES

(71) Applicant: Welldata (Subsurface Surveillance Systems) Ltd., Fife (GB)

(72) Inventor: Sydney Joseph Littleford, Fife (GB)

(73) Assignee: Welldata (Subsurface Surveillance Systems) Ltd., Fife (GB)

( * ) Notice: Subject to any disclaimer, the term of this patent is extended or adjusted under 35 U.S.C. 154(b) by 627 days.

(21) Appl. No.: 14/951,762

(22) Filed: Nov. 25, 2015

(65) Prior Publication Data

US 2016/0146658 A1 May 26, 2016

(30) Foreign Application Priority Data

Nov. 25, 2014 (GB) .................................... 1420938.1

(51) Int. Cl.
*G01S 13/34* (2006.01)
*G01S 13/88* (2006.01)
*G01F 23/284* (2006.01)

(52) U.S. Cl.
CPC ............ *G01F 23/284* (2013.01); *G01S 13/34* (2013.01); *G01S 13/88* (2013.01)

(58) Field of Classification Search
CPC .................................................... G01F 23/284
See application file for complete search history.

(56) References Cited

U.S. PATENT DOCUMENTS

| | | | |
|---|---|---|---|
| 4,210,023 A | 7/1980 | Sakamoto et al. | |
| 4,621,264 A | 11/1986 | Yashiro et al. | |
| 4,661,817 A | 4/1987 | Bekkadal et al. | |
| 4,926,391 A | 5/1990 | Rector et al. | |
| 5,773,984 A | 6/1998 | Suyama et al. | |
| 6,202,485 B1 * | 3/2001 | Wien ................... | G01F 23/284 324/642 |
| 6,353,418 B1 * | 3/2002 | Burger .................. | G01F 23/284 333/21 A |

(Continued)

FOREIGN PATENT DOCUMENTS

| CN | 104035092 A | 9/2014 |
|---|---|---|
| GB | 2 414 611 A | 11/2005 |

(Continued)

OTHER PUBLICATIONS

Yu et al, "High-Performance Circular $TE_{01}$-Mode Converter," IEEE Transactions on Microwave Theory and Techniques, vol. 53, No. 12, Dec. 2005, pp. 3794-3798.

(Continued)

*Primary Examiner* — Peter M Bythrow
(74) *Attorney, Agent, or Firm* — Myers Bigel, P.A.

(57) ABSTRACT

A structure defines an elongate space and comprises an apparatus installed within the structure. The apparatus includes a signal generator and detector arrangement, and at least one antenna coupled to the signal generator and detector arrangement. The at least one antenna is coupled to the elongate space for transmitting an electromagnetic signal into the elongate space and for receiving the electromagnetic signal from the elongate space after reflection of the electromagnetic signal from a feature within the elongate space. The apparatus may be used to monitor the feature within the elongate space.

65 Claims, 9 Drawing Sheets

(56) References Cited

U.S. PATENT DOCUMENTS

| | | | |
|---|---|---|---|
| 6,414,625 B1* | 7/2002 | Kleman | G01F 23/284 342/124 |
| 6,469,676 B1* | 10/2002 | Fehrenbach | G01F 23/284 343/786 |
| 6,765,524 B2* | 7/2004 | Kleman | G01F 23/284 342/124 |
| 7,030,827 B2 | 4/2006 | Mahler et al. | |
| 7,453,265 B2 | 11/2008 | Johnstad et al. | |
| 8,353,677 B2 | 1/2013 | Thompson et al. | |
| 2004/0046573 A1* | 3/2004 | Schroth | G01F 23/284 324/644 |
| 2004/0113853 A1* | 6/2004 | Serban | G01F 23/284 343/703 |
| 2004/0173020 A1* | 9/2004 | Edvardsson | G01F 23/284 73/290 V |
| 2006/0000274 A1* | 1/2006 | Kallsand | G01F 23/284 73/290 V |
| 2007/0085729 A1* | 4/2007 | Edvardsson | G01F 23/284 342/124 |
| 2008/0062037 A1* | 3/2008 | Edvardsson | G01F 23/284 342/124 |
| 2009/0031578 A1 | 2/2009 | Suzuki et al. | |
| 2009/0128395 A1* | 5/2009 | Baath | |
| 2009/0229359 A1* | 9/2009 | Reimelt | G01F 23/284 73/304 R |
| 2009/0302867 A1* | 12/2009 | Schroth | G01F 23/284 324/642 |
| 2009/0315758 A1 | 12/2009 | Jirskog | |
| 2010/0090883 A1* | 4/2010 | Chen | G01F 23/284 342/124 |
| 2010/0231438 A1* | 9/2010 | Ohlsson | G01F 23/284 342/124 |
| 2010/0237871 A1* | 9/2010 | Allouche | G01S 13/0209 324/337 |
| 2011/0079402 A1 | 4/2011 | Darby et al. | |
| 2011/0081256 A1 | 4/2011 | Thompson et al. | |
| 2011/0209540 A1* | 9/2011 | Banks | E21B 29/00 73/152.16 |
| 2012/0084055 A1* | 4/2012 | Smithson | E21B 47/042 702/166 |
| 2012/0153969 A1* | 6/2012 | Eckert | G01F 23/284 324/637 |
| 2012/0169528 A1* | 7/2012 | Edvardsson | G01F 23/284 342/124 |
| 2012/0242532 A1* | 9/2012 | Fouarge | B01J 8/0015 342/124 |
| 2012/0280852 A1 | 11/2012 | Allouche et al. | |
| 2012/0319891 A1* | 12/2012 | Edvardsson | G01F 23/284 342/124 |
| 2013/0009803 A1* | 1/2013 | Edvardsson | G01F 23/284 342/124 |
| 2013/0108474 A1 | 5/2013 | Thompson et al. | |
| 2014/0083183 A1* | 3/2014 | Edvardsson | G01F 25/0061 73/290 V |
| 2014/0085132 A1* | 3/2014 | Jirskog | G01F 23/284 342/124 |
| 2015/0168201 A1* | 6/2015 | Cobianu | G01F 23/284 342/124 |
| 2015/0168247 A1 | 6/2015 | Gundersen | |
| 2015/0276460 A1* | 10/2015 | Georgescu | G01F 23/284 342/124 |
| 2015/0377678 A1* | 12/2015 | Edvardsson | G01F 23/284 342/124 |
| 2015/0377680 A1* | 12/2015 | Edvardsson | H01Q 1/225 73/290 V |
| 2016/0103008 A1* | 4/2016 | Edvardsson | G01S 13/88 342/124 |

FOREIGN PATENT DOCUMENTS

| | | |
|---|---|---|
| GB | 2463890 A | 3/2010 |
| JP | H03-272488 A | 12/1991 |
| JP | 2012-215427 A | 11/2012 |
| KR | 10-1411573 B1 | 6/2014 |
| WO | WO 01/53851 A1 | 7/2001 |
| WO | WO 2004/083790 A1 | 9/2004 |
| WO | WO 2011/044023 A2 | 4/2011 |
| WO | WO 2012/151488 A1 | 11/2012 |

OTHER PUBLICATIONS

Search Report, GB1520749.1, dated May 31, 2016, 6 pages.
Patents Act 1977: Search Report under Section 17(5), UKIPO Application No. 1420938.1, dated Feb. 26, 2015, 5 pp.
International Search Report, International Application No. PCT/GB2014/051836, dated Jul. 6, 2015, 8 pp.
Patents Act 1977: Search Report under Section 17(5), UKIPO Application No. 1310679.4, dated Jan. 9, 2014, 6 pp.
Patents Act 1977: Combined Search and Examination Report under Sections 17 and 18(3), UKIPO Application No. 1410628.0, dated Oct. 20, 2014, 2 pp.
Agilent Technologies, "Agilent Time Domain Analysis Using a Network Analyzer: Application Note 1287-12" May 2, 2012, 48 pp.
Dr.-Ing. Detlef Brumbi, "Fundamentals of Radar Technology for Level Gauging, 4™ edition (revised and expanded)", © Krohne, Jul. 2003, 65 pp.
Geib, "Inspection of Cased Pipe by Guided Electromagnetic Wave Technology", © 2007 Profile Technologies, Inc. for AGA Corrosion Committee Meeting, Phoenix, AZ, May 13, 2008, 21 pp.
Lens Corrected Conical Horn, Sep. 27, 2002, 1 p.
Sam et al., "Fully automated Fluid Level Measurement Tool" (SPE 145434), SPE Asia Pacific Oil and Gas Conference and Exhibition, Jakarta, Indonesia, Sep. 20, 2011 — Sep. 22, 2011, 12 pp.
Wang et al., Seminar Paper—"Acoustic Reflectometry for Gas Pipelines-Monitoring Features in Gas Pipelines Using Acousteker®", Aberdeen 2009: Pigging Products and Services Association (PPSA), https://ppsa-online.com/papers/09-Aberdeen/2009-01-Wang.pdf, 7 pp.
Wang et al., "Ultrasonic and Electromagnetic Sensors for Downhole Reservoir Characterization", Proceedings, Thirty-Sixth Workshop on Geothermal Reservoir Engineering, Stanford University, Stanford, California, Jan. 31, 2011 — Feb. 2, 2011, 7 pp.

* cited by examiner

MONITORING STRUCTURES

RELATED APPLICATION

This application claims priority from British Patent Application No. 14 20 938.1, filed Nov. 25, 2014, the disclosure of which is incorporated by reference herein in its entirety.

FIELD OF INVENTION

An apparatus and a method are described herein for detecting and/or monitoring a feature within an elongate space defined by a structure, e.g. a subterranean well and/or offshore well and/or an oil/gas well. Various structures are also described herein which incorporate the apparatus.

BACKGROUND TO INVENTION

It is known to use Time Domain Reflectometry techniques for detecting a fluid level in a tank in which an electromagnetic pulse is radiated from a transmitter to an interface between two fluids and a reflection of the electromagnetic pulse from the interface is detected at a receiver. The time taken by the pulse to travel from the transmitter to the interface and back to the receiver provides an indication of the level of the fluid in the tank.

SUMMARY OF INVENTION

Any of the features of any one of the following aspects may apply alone or in any combination in relation to any of the other aspects.

According to a first aspect of the present invention there is provided a structure defining an elongate space, the structure comprising an apparatus installed within the structure, wherein the apparatus includes or comprises:

a signal, generator and detector arrangement; and at least one antenna coupled to the signal generator and detector arrangement, wherein the at least, one antenna is coupled to the elongate space for transmitting an electromagnetic signal into the elongate space and for receiving the electromagnetic signal from the elongate space after reflection of the electromagnetic signal from a feature within the elongate space.

The at least one antenna may be coupled to the elongate space for transmitting an electromagnetic signal through the elongate space, e.g. oil/gas well, and for receiving the electromagnetic signal from the elongate space after reflection of the electromagnetic signal from the feature within the elongate space.

The at least one antenna may be coupled to the elongate space for transmitting an electromagnetic signal axially along the elongate space and for receiving the electromagnetic signal axially from the elongate space after reflection of the electromagnetic signal from the feature within the elongate space.

The apparatus may be used to detect and/or monitor the feature within the elongate space.

The feature may be spatially localised within the elongate space.

The feature may be spatially distributed within the elongate space.

The feature may comprise an interface between two different fluids in the elongate space.

The feature may comprise a non-uniformity or a discontinuity in cross-section of the elongate space.

The feature may comprise an object located in the elongate space.

The object may be deliberately located in the elongate space. The object may, for example, comprise a valve or the like. The apparatus may be configured to determine a configuration, condition, state, status, or setting of the object. The apparatus may, for example, be configured to determine a condition, state, status, or setting of a valve located within the elongate space.

The object may comprise a junction between the elongate space and, a further elongate space. The junction may, for example, be defined by two or more fluid conduits or two or more structural members.

The feature may comprise a foreign object located in the elongate space such as an object which encroaches or which is inadvertently located in the elongate space.

The feature may comprise particulates such as sand, gravel or the like.

The feature may comprise an obstruction, impairment, restriction, or occlusion of the elongate space.

The feature may comprise a non-uniformity or discontinuity in a property of a surface of the structure which defines the elongate space.

The feature may comprise a non-uniformity or discontinuity in roughness or electrical conductivity of the surface of the structure which defines the elongate space.

The feature may comprise a deposit formed on a surface of the structure which defines the elongate space.

The feature may comprise at least one of hydrates, wax, scale, and the like formed on a surface of the structure which defines the elongate space.

The feature may comprise corrosion of a surface of the structure which defines the elongate space. The apparatus may permit a degree of the corrosion or a rate of change of the corrosion to be monitored.

The apparatus may be incorporated into the structure and/or embedded in the structure.

The apparatus may be located at least partially within the elongate space.

The at least one antenna may be located in, or adjacent to one end of the elongate space.

The signal generator and detector arrangement may be provided separately form the at least one antenna. The signal generator and detector arrangement may be isolated from an environment within the elongate space. The signal generator and detector arrangement may be isolated from the effects of the environment within the elongate space. The signal generator and detector arrangement may be isolated from the effects of temperature within the elongate space.

The apparatus may be located wholly within the elongate space.

The apparatus may be located at or adjacent to one end of the elongate space.

The at least one antenna may be located at or adjacent to one end of the elongate space.

The at least one antenna may be located at or adjacent to one end of a well for producing a hydrocarbon fluid or for injecting water.

The at least one antenna may be located at or adjacent to a wellhead or a Christmas tree.

The at least one antenna may be located at or adjacent to a surface of the ground or a surface of the seabed.

The apparatus may be permanently installed within the structure.

The apparatus may be temporarily installed within the structure.

The structure may comprise a tubular member, wherein the tubular member defines the elongate space.

The tubular member may comprise at least one of a length of tubing, a liner, a hollow shaft, a conduit, a pipe, a length of casing, a pipeline, a conductor, a riser, a duct such as an air duct, a structural member, a support member, a pole, a leg, and a spar.

At least part of the structure may be configured for use above ground.

The structure may comprise at least one of a building, a bridge, a dam, a pylon, a platform, a rig, an installation, a mast, and a tower.

The structure may comprise a power station such as a nuclear power station.

At least part of the structure may be configured for use downhole.

The structure may define a well for producing a hydrocarbon fluid or for injecting water.

The structure may comprise a tubular member which defines the elongate space.

The structure may comprise a string of tubular members, which string defines the elongate space.

The structure may be configured for use in a well for producing a hydrocarbon fluid or for use in a well for injecting water.

The structure may comprise a wellhead or a Christmas tree.

At least part of the structure may be configured for use subsea.

The structure may be semi-submersible.

The structure may comprise at least one of an offshore installation, an offshore rig, and an offshore platform.

The structure may be configured to float on water.

The structure may comprise a vessel or a ship.

The structure may comprise a subsea conductor or a subsea riser.

The elongate space may be defined by an electrically conductive material.

The elongate space may be defined by a metal.

The elongate space may be defined by steel.

The elongate space may have a circular cross-section.

The elongate space may have an annular cross-section.

The elongate space may have a rectangular cross-section.

The elongate space may have a square cross-section.

The elongate space may be sealed.

The structure may define a sealed well for producing a hydrocarbon fluid or for injecting water.

The elongate space may be isolated from a pressure of an environment external to the elongate space.

The elongate space may be exposed to a pressure of an environment external to the elongate space.

The apparatus may be configured for use in a high pressure environment.

The apparatus may be configured for use in pressures of up to 1000 PSI, pressures of up to 3,000 PSI, pressures of up to 5,000 PSI, pressures of up to 10,000 PSI, and/or pressures of up to 15,000 PSI.

The apparatus may be configured for use in a low pressure environment having a pressure less than atmospheric pressure.

The apparatus may be configured for use in a vacuum.

The signal generator and detector arrangement may comprise a signal generator and a signal detector.

The signal generator and detector arrangement may comprise a Vector Network Analyser (VNA).

The electromagnetic signal may have a frequency in a frequency range of 1 GHz to 100 GHz, 2 GHz to 50 GHz, 4 GHz to 40 GHz, 20 to 60 GHz or up to 75 GHz.

The at least one antenna may comprise a single antenna for transmitting an electromagnetic signal into the elongate space and receiving the electromagnetic signal from the elongate space after reflection of the electromagnetic signal from a feature within the elongate space. The signal generator and detector arrangement may comprise a single port which is coupled to the single antenna. The generated and detected signals may both pass in opposite directions through the single port of the signal generator and detector arrangement.

The at least one antenna may comprise a transmitter antenna for transmitting an electromagnetic signal into the elongate space and a receiver antenna for receiving the electromagnetic signal from the elongate space after reflection of the electromagnetic signal from the feature within the elongate space. The signal generator and detector arrangement may comprise first and second ports, wherein the first port is coupled to the transmitter antenna and the second port is coupled to the receiver antenna. The first port may be coupled to the transmitter antenna by a first transition. The second port may be coupled to the receiver antenna by a second transition. The generated signal may pass out through the first port of the signal generator and detector arrangement and the detected signal may pass in through the second port of the signal generator and detector arrangement.

The apparatus may comprise a controller for controlling the signal generator and detector arrangement.

The controller may be configured to detect the feature within the elongate space from a signal generated by the signal generator and detector arrangement and a signal detected by the signal generator and detector arrangement.

The controller may be configured to determine a distance between the apparatus and the feature within the elongate space from the signals generated and detected by the signal generator and detector arrangement.

The controller may be configured to determine a change in the distance between the apparatus and the feature from the signals generated and detected by the signal generator and detector arrangement over a period of time.

The controller may be configured for communication with an operator.

The apparatus may comprise at least one transition which couples the signal generator and detector arrangement to the at least one antenna.

The at least one antenna may comprise a single antenna, and the at least one transition may comprise a single transition which is configured to convert between a waveguide mode at the signal generator and detector arrangement and an electromagnetic mode at the single antenna.

The at least one antenna may comprise a transmitter antenna and a receiver antenna. The at least one transition may comprise a first transition which is configured to convert between a waveguide mode at a first port of the signal generator and detector arrangement and an electromagnetic mode at the transmitter antenna. The at least one transition may comprise a second transition which is configured to convert between a waveguide mode at a second port, of the signal generator and detector arrangement and an electromagnetic mode at the receiver antenna.

The waveguide mode at the signal generator and detector arrangement may comprise a circular waveguide mode. The waveguide mode at the signal generator and detector arrangement may comprise a rectangular waveguide mode.

The waveguide mode at the signal generator and detector arrangement may comprise a TE mode. The waveguide mode at the signal generator and detector arrangement may comprise a $TE_{10}$ rectangular waveguide mode.

The electromagnetic mode at the single antenna may comprise a circular electromagnetic mode. The electromagnetic mode at the single antenna may comprise a TE electromagnetic mode. The electromagnetic mode at the single antenna may comprise a $TE_{0n}$ electromagnetic mode such as a $TE_{01}$ electromagnetic made.

The apparatus may comprise a body or an enclosure.

The signal generator and detector arrangement may be housed within the body or the enclosure.

The at least one antenna may be housed within the body or the enclosure.

The at least one antenna may be defined by the body or the enclosure.

The at least one transition may be housed within the body or the enclosure.

The at least one transition may be defined by the body or the enclosure.

The body or the enclosure may comprise a window which is at least partially transparent to the electromagnetic signal.

The body or the enclosure may provide environmental and/or mechanical protection to at least one of the signal generator and detector arrangement, the transition and the at least one antenna. The body or the enclosure may isolate at least one of the signal generator and detector arrangement, the transition and the at least one antenna from a fluid pressure external to the enclosure.

The at least one antenna may be provided with the at least one transition.

The at least one antenna may be detachably attached to the at least one transition.

The at least one antenna may be detachably attached to the body or the enclosure.

Such an apparatus may be modular in the sense that the at least one antenna may be readily replaced or interchanged with an alternative at least one antenna according to the configuration of the elongate space.

The at least one transition may be detachably attached to the body or the enclosure.

Such an apparatus may be modular in the sense that the at least one transition may be readily replaced or interchanged with an alternative at least one transition according to the configuration of the at least one antenna and/or according to the configuration of the co-axial cable and/or a waveguide used to convey an electromagnetic signal to and/or from the at least one transition.

The signal generator and detector arrangement and the at least one antenna may be provided separately.

The apparatus may comprise a co-axial cable and/or a waveguide connecting the signal generator and detector arrangement and the at least one transition.

The waveguide may be defined by, or housed within, the body or the enclosure.

The signal generator and detector arrangement and the at least one antenna may be housed or integrated together.

The signal generator, and detector arrangement and the at least one antenna may be housed within the body or the enclosure.

The signal generator and detector arrangement, the at least one transition and the at least one antenna may be housed or integrated together.

The signal generator and detector arrangement, the at least one transition and the at least one antenna may be housed within the body or the enclosure.

The apparatus may comprise a cable which extends through the body or the enclosure for supplying electrical power to the apparatus and/or for communications such as Ethernet communications.

The apparatus may comprise a cable seal member for sealing the cable with respect to the body or the enclosure.

The apparatus may comprise one or more seal members on an outer surface of the body or the enclosure.

The apparatus may comprise one or more connectors for supplying electrical power to the apparatus and/or for communications such as Ethernet communications.

The apparatus may be configured for use in an explosive environment. For example, cable and/or the one or more connections may be compatible or compliant with an ATEX directive.

The structure may define a further elongate space. The at least one antenna may comprise a transmitter antenna which is configured to transmit an electromagnetic signal into the elongate space, and a receiver antenna which is configured to, receive the electromagnetic signal from the further elongate space after reflection of the electromagnetic signal from a feature located within the elongate space and/or the further elongate space.

The elongate space and the further elongate space may extend alongside one another.

One of the elongate and the further elongate spaces may be defined within, or be surrounded by, the other of the elongate and the further elongate spaces.

The structure may comprise a tubular member which defines the elongate space and a further tubular member which defines the further elongate space.

One of the tubular and the further tubular members may be contained within, or may be surrounded by, the other of the tubular and the further tubular members.

According to a second aspect of the present invention there is provided a method for use in monitoring a feature within an elongate space defined by a structure, the method comprising:

installing an apparatus within the structure;

generating a signal using a signal generator and detector arrangement and coupling the generated signal to at least one antenna of the apparatus so as to transmit an electromagnetic signal from the at least one antenna into the elongate space;

receiving the electromagnetic signal at the at least one antenna from the elongate space after reflection of the electromagnetic signal from a feature within the elongate space; and detecting a signal received from the at least one antenna using the signal generator and detector arrangement.

The method may comprise incorporating the apparatus into the structure.

The method may comprise embedding the apparatus in the structure.

The method may comprise locating the apparatus at least partially within the elongate space.

The method may comprise locating the apparatus wholly within the elongate space.

The method may comprise installing the apparatus permanently within the structure.

The feature may be spatially localised within the elongate space.

The feature may be spatially distributed within the elongate space.

The feature may comprise an interface between two different fluids in the elongate space.

The feature may comprise a non-uniformity or a discontinuity in cross-section of the elongate space.

The feature may comprise an object located in the elongate space.

The object may be deliberately located in the elongate space. The object may, for example, comprise a valve or the like.

The method may permit a configuration, condition, state, status, or setting of the object to be determined. The method may, for example, permit a configuration, condition, state, status, or setting of a valve to be determined.

The object may comprise a junction between the elongate space and a further elongate space. The junction may, for example, be defined by two or more fluid conduits or two or more structural members.

The feature may comprise a foreign object located in the elongate space such as an object which encroaches or which is inadvertently located in the elongate space.

The feature may comprise comprises particulates such as sand, gravel or the like.

The feature may comprise an obstruction, impairment, restriction, or occlusion of the elongate space.

The feature may comprise a non-uniformity or discontinuity in a property of a surface of the structure which defines the elongate space.

The feature may comprise a non-uniformity or discontinuity in roughness or electrical conductivity of the surface of the structure which defines the elongate space.

The feature may comprise a deposit formed on a surface of the structure which defines the elongate space.

The feature may comprise at least one of hydrates, wax, scale, and the like formed on a surface of the structure which defines the elongate space.

The method may comprise sealing the elongate space before transmitting the electromagnetic signal.

The method may comprise pressurising the elongate space before transmitting the electromagnetic signal.

The method may comprise exposing the elongate space to a pressure of a fluid surrounding the elongate space before transmitting the electromagnetic signal.

The fluid pressure in the elongate space may be up to 1,000 PSI, up to 3,000 PSI, up to 5,000 PSI, up to 10,000 PSI or up to 15,000 PSI.

The method may comprise determining a distance between the apparatus and the feature within the elongate space from the generated and detected signals.

The method may comprise determining a change of the distance between the apparatus and the feature within the elongate space from the generated and detected signals.

The method may comprise repeatedly determining the distance between the apparatus and an interface between two different fluids so as to permit real-time or dynamic measurements of a level of the interface.

The method may comprise controlling a pump according to the determined distance between the apparatus and the interface.

The method may comprise using a determined distance between the apparatus and the interface, a known pressure at the apparatus, and a known specific gravity of any fluids located between the apparatus and the interface to determine a pressure at the interface.

The electromagnetic signal may have a frequency in a frequency range of 1 GHz to 100 GHz, 2 GHz to 50 GHz, 4 GHz to 40 GHz, or 20 to 60 GHz or up to 75 GHz.

The method may comprise generating the signal with at least 10 different frequencies, at least 100 different frequencies, at least 1,000 different frequencies, or at least 10,000 different frequencies.

The method may comprise sequentially varying a frequency of the generated signal.

The method may comprise altering the detected signals received for each of the different transmitted frequencies to correct or account for any differences in propagation speed of the different frequencies. The sequential variation of the frequency of the generated signal may allow or facilitate such correction. Such correction may provide enhanced distance measurement accuracy, resolution, sensitivity and/or range relative to known distance measurement methods.

The method may comprise:

measuring a magnitude of the detected signal as a function of frequency;

measuring a phase of the detected signal as a function of frequency;

measuring a magnitude of the generated signal as a function of frequency; and measuring a phase of the generated signal as a function of frequency.

The method may comprise:

determining a magnitude frequency spectrum from the magnitude of the detected signal and the magnitude of the generated signal as a function of frequency; and determining a phase frequency spectrum from the phase of the detected signal and the phase of the generated signal as a function of frequency.

The method may comprise using a VNA to determine the magnitude frequency spectrum and a phase frequency spectrum.

The method may comprise:

determining a time domain reflectance trace from the magnitude frequency spectrum and the phase frequency spectrum; and determining a distance between the apparatus and a feature within the elongate space from the time domain reflectance trace.

The method may comprise using a Frequency Domain Reflectometry (FDR) technique to determine a distance between the apparatus and a feature within the elongate space.

The method may comprise detecting a signal at the apparatus after reflection of the transmitted electromagnetic signal from a plurality of features within the elongate space.

Each feature may comprise an interface between two different fluids.

The method may comprise determining a nature of the feature within the elongate space from a configuration of one or more reflectance features in at least one of the magnitude frequency spectrum, the phase frequency spectrum, and the time domain reflectance trace.

The method may comprise determining a nature of the feature from the size and/or shape of a reflectance profile or peak in at least one of the magnitude frequency spectrum, the phase frequency spectrum, and the time domain reflectance trace.

The method may comprise determining a dielectric property of the feature from a configuration of one or more reflectance features in at least one of the magnitude frequency spectrum, the phase frequency spectrum, and the time domain reflectance trace. The dielectric, property may be permittivity, dielectric constant or the like. For example, the dielectric property may be permittivity across a range of frequencies. Dielectric spectroscopy techniques may be applied to determine the dielectric property. The dielectric spectroscopy techniques may utilise the time and/or frequency domains. Time Domain Reflectometry (TDR) or Time Domain Spectroscopy (TDS) may be used to determine the dielectric property. Such a method may allow fast and accurate identification of the composition of one or more materials within the elongate space.

The method may comprise using a Frequency-modulated Continuous Wave (FMCW) technique or a Frequency-modulated Interrupted Continuous Wave (FMiCW) technique to determine the distance between the apparatus and the feature within the elongate space.

The method may comprise repeatedly sweeping the frequency of the transmitted electromagnetic signal through each of the plurality of different frequencies.

The method may comprise continuously sweeping the frequency of the transmitted electromagnetic signal through each of the plurality of, different frequencies.

The method may comprise determining the distance between the apparatus and the feature within the elongate space from a frequency of the detected signal.

The method may comprise determining the distance between the apparatus and the feature within the elongate space by comparing a frequency of the detected signal to a frequency of the generated signal.

The method may comprise mixing at least a portion of the generated signal with at least a portion of the detected signal to produce a beat signal.

The method may comprise mixing at least a portion of the transmitted electromagnetic signal with at least a portion of the received electromagnetic signal to produce a beat electromagnetic signal.

The method may comprise demodulating the beat signal.

The method may comprise determining the distance between the apparatus and the feature within the elongate space from a magnitude of the demodulated beat signal.

Such a Frequency-modulated Continuous Wave (FMCW) method or a Frequency-modulated Interrupted Continuous Wave FMiCW method may be simpler and, therefore, more cost effective to implement than a Frequency Domain Reflectometry (FDR) method.

The method may comprise using an FDR method and then using an FMCW method or an FMiCW method to determine a distance to a feature within the elongate space.

The method may comprise using a VNA to implement the FDR method and then using an FMCW signal generator and detector arrangement to implement the FMCW method or using an FMiCW signal generator and detector arrangement to implement the FMiCW method.

The method may comprise measuring a range for different frequencies, different bandwidths, and/or different electromagnetic modes using the FDR method.

The method may comprise identifying the optimum frequency, optimum bandwidth, and/or optimum electromagnetic mode for maximum range.

The method may comprise adapting the FMCW method or the FMiCW method according to the optimum frequency, optimum bandwidth, and/or optimum electromagnetic mode determined using the FDR method.

An FDR method may provide greater flexibility in terms of frequency, bandwidth, electromagnetic mode, and range compared with an FMCW method or an FMiCW method. Accordingly, using an FDR method and then using an FMCW method or an FMiCW method to determine the distance to a feature within the elongate space may allow a measurement range of the FMCW method or the FMiCW method to be maximised.

According to a third aspect of the present invention there is provided an apparatus for monitoring an elongate space, the apparatus comprising:

a signal generator and detector arrangement;

an antenna; and a transition which converts a waveguide mode at the signal generator and detector arrangement to an electromagnetic mode at the antenna, wherein the signal generator and detector arrangement the antenna and the transition are integrated together.

The signal generator and detector arrangement may comprise a signal generator and a signal detector.

The signal generator and detector arrangement may comprise a vector network analyser.

The apparatus may comprise a body or an enclosure.

The signal generator and detector arrangement may be housed within the body or the enclosure.

The antenna may be housed within the body or the enclosure.

The antenna may be defined by the body or the enclosure.

The transition may be housed within the body or the enclosure.

The transition may be defined by the body or the enclosure.

The signal generator and detector arrangement, the antenna and the transition may be housed within the body or the enclosure.

BRIEF DESCRIPTION OF DRAWINGS

An apparatus and a method for monitoring an elongate space defined by a structure, and a structure which incorporates the apparatus are described herein by way of non-limiting example only with reference to the following drawings of which.

DETAILED DESCRIPTION OF DRAWINGS

Figure 1:
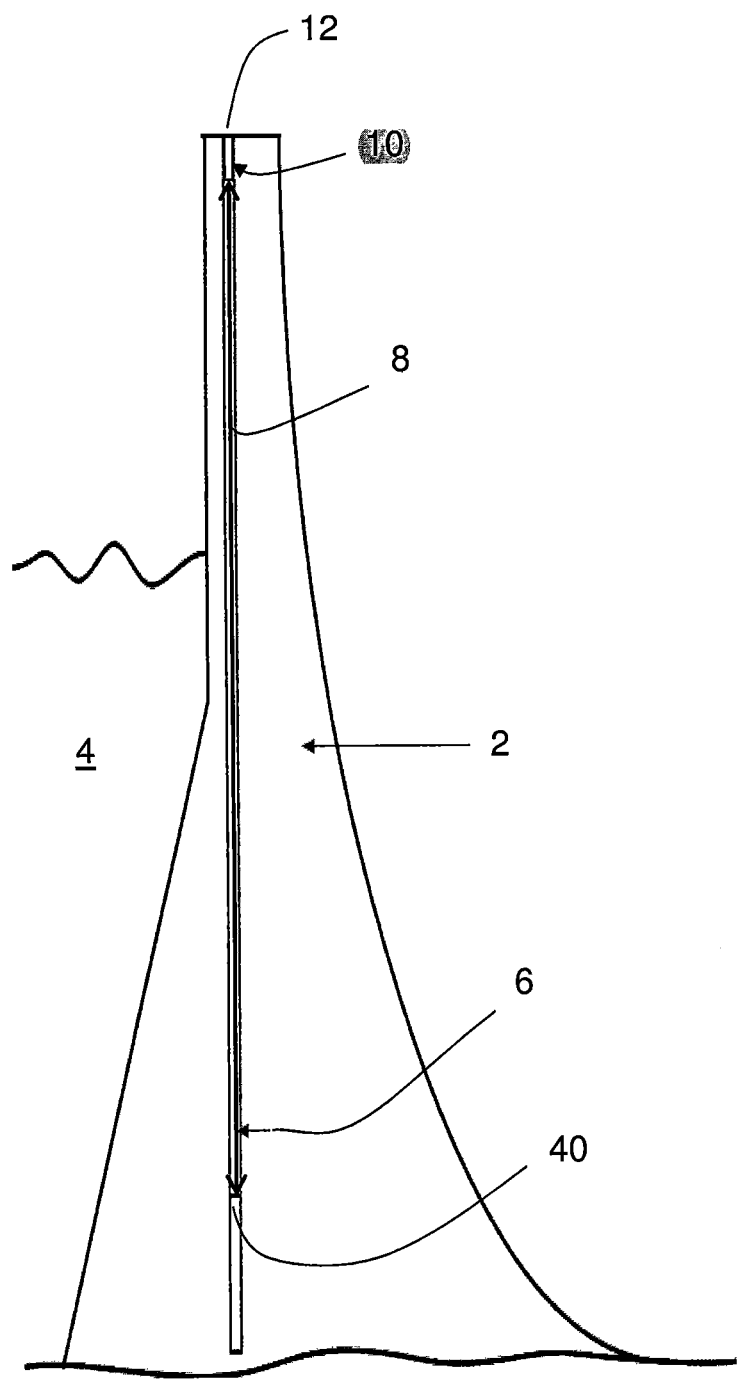
FIG. 1 is a schematic of a dam incorporating an apparatus for monitoring an elongate space defined by the dam.

Referring initially to FIG. 1 there is shown a structure in the form of a dam generally designated 2 for retaining a body of water 4. The dam 2 includes a steel tubular member 6 which defines an elongate space 8. The dam 2 includes an apparatus generally designated 10 for monitoring the elongate space 8. The apparatus 10 is installed or incorporated into the dam 2 at an upper end 12 of the elongate space 8. In use, the apparatus 10 may be used for detecting any changes within the elongate space 8 as will be described in more detail below.

Figure 2:
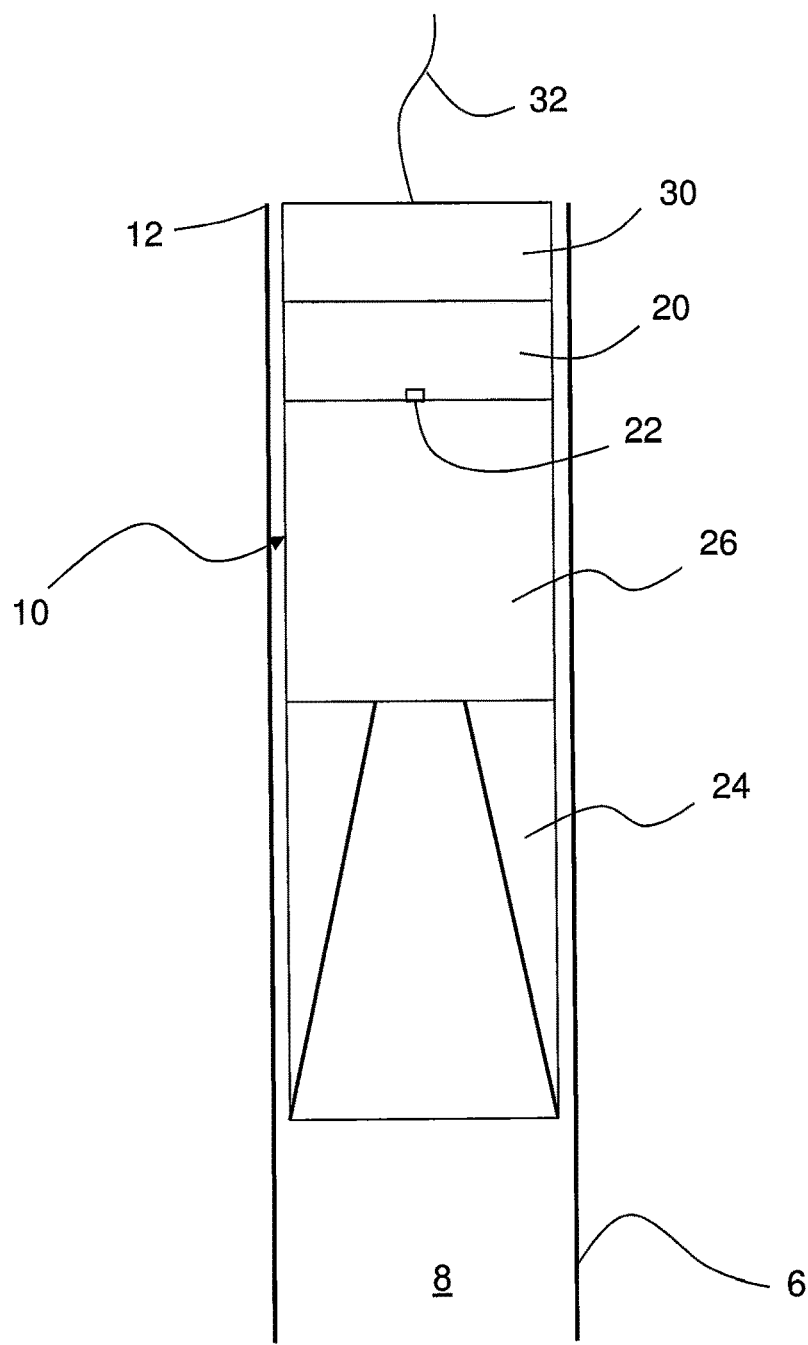
FIG. 2 is a detailed schematic of an upper end region of the elongate space defined by the dam of FIG. 1 showing the apparatus for monitoring the elongate space.

FIG. 2 shows the apparatus 10 located within the upper end 12 of the elongate space 8. The apparatus 10 includes a signal generator and detector arrangement in the form of a VNA 20 having a port 22. The apparatus 10 includes a horn antenna 24 and a transition 26 which couples the port 22 of the VNA 20 to the antenna 24. One of ordinary skill in the art will understand that the exact configuration of the transition 26 will depend on the exact configuration of the port 22 and the exact configuration of the antenna 24. In general, the apparatus 10 is not limited by the particular configuration of the transition 26 and any known type of transition may be used. For example, a transition such as that described in "*High-Performance Circular $TE_{01}$-Mode Converter*", Ching-Fang Yu and Tsun-Hsu Chang, IEEE Transactions on Microwave Theory and Techniques, Vol. 53, No. 12, December 2005, may be used to convert a rectangular $TE_{10}$ waveguide mode at the port 22 of the VNA 20 to a circular $TE_{01}$ electromagnetic mode at the antenna 24. The apparatus 10 includes a controller 30. The VNA 20, the horn antenna 24, the transition 26 and the controller 30 are integrated together to form a rigid body. The apparatus 10 may receive electrical power from a power supply (not shown) and/or communicate with an operator (not shown) via a cable 32.

As will be described in more detail below, the apparatus 10 employs a Frequency Domain Reflectometry (FDR) technique to determine a distance between the apparatus 10 and the air-water interface 40. The VNA 20 generates a radio frequency electrical signal at the port 22. The frequency of the electrical signal is varied sequentially in the range 4 to 40 Typically, the VNA 20 sequentially generates 10,000 or more different radio frequencies in the range 4 to 40 GHz. The transition 26 converts the waveguide mode at the port 22 to a circular $TE_{01}$ electromagnetic mode for transmission by the antenna 24 into the elongate space 8. The $TE_{01}$ mode propagates through the elongate space 8 until it encounters a feature such as an air-water interface 40 shown in FIG. 1 within the elongate space 8. At least a portion of the electromagnetic signal is reflected from the air-water interface 40 and propagates as a guided $TE_{01}$ mode back up through the elongate space 8 to the antenna 24. The transition 26 couples the circular $TE_{01}$ mode received at the antenna 24 into a waveguide mode at the port 22 for detection by the VNA 20.

The VNA 20 determines the magnitudes and phases of both the generated and detected signals as a function of frequency and determines a magnitude frequency spectrum and a phase frequency spectrum from the measured magnitudes and phases of both the generated and detected signals. The controller 30 uses an inverse Fourier transform to determine a reflectance time domain trace from the magnitude frequency spectrum and the phase frequency spectrum determined by the VNA 20. The controller 30 determines a distance between the apparatus 10 to the air-water interface 40 from the determined reflectance time domain trace. The controller 30 continually determines the reflectance time domain trace and continually determines the distance between the apparatus 10 to the air-water interface 40 from successive reflectance time domain traces to allow the position of the air-water interface 40 to be monitored.

Additionally or alternatively, it should be understood that the controller 30 may identify and/or determine the position of other features within the elongate space 8 from the determined reflectance time domain trace and/or the controller 30 may determine any changes in any such other features or the position of any such other features within the elongate space 8 from successive reflectance time domain traces. Examples of such other features include one or more further interfaces between two different fluids in the elongate space 8, a non-uniformity or discontinuity in cross-section of the elongate space 8, an object located in the elongate space 8, particulates such as sand or the like within the elongate space 8, an obstruction, impairment, restriction, or occlusion of the elongate space 8, a non-uniformity or discontinuity in a property of an inner surface of the tubular member 6 which defines the elongate space 8, a non-uniformity or discontinuity in roughness or electrical conductivity of the inner surface of the tubular member 6 which defines the elongate space 8, and a deposit comprising at least one of hydrates, wax, scale, corrosion and the like formed on the inner surface of the tubular member 6 which, defines the elongate space 8.

Figure 3:
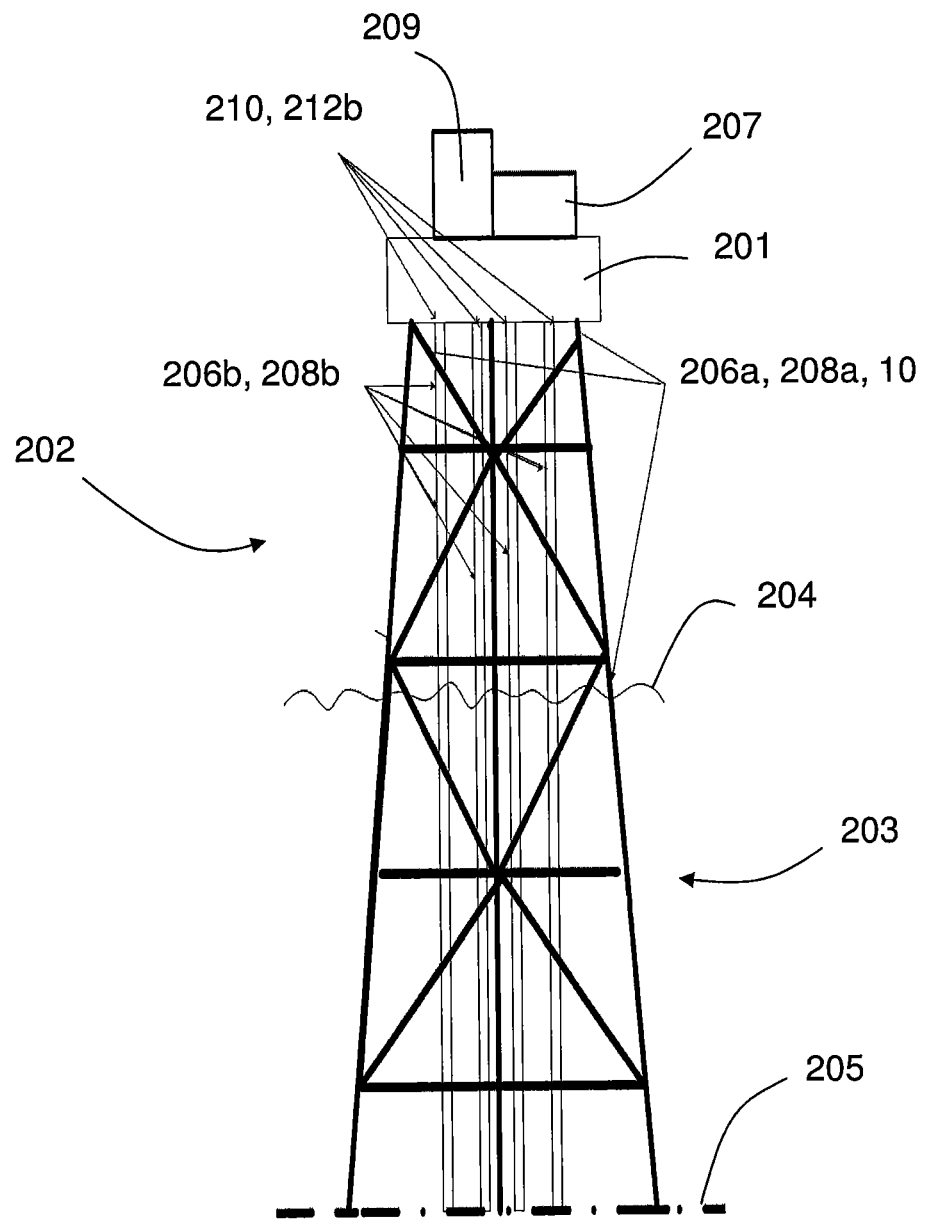
FIG. 3 is a schematic of an offshore platform defining a plurality of elongate spaces, the offshore platform including one apparatus configured for monitoring each elongate space.

Referring to FIG. 3 there is shown a structure in the form of an offshore platform generally designated 202 located in the sea 204 resting on the seabed 205. The platform 202 includes a deck 201 and a support structure 203 which supports the deck 101. The platform 202 includes a power supply 207 on the deck 201 and a control room 209 on the deck 201. The platform 202 may, for example, be a drilling or production platform. The support structure 203 includes a plurality of interconnected structural steel tubular members 206a, each structural steel tubular member 206a defining a corresponding elongate space 208a. The platform 202 further includes a plurality of steel fluid conduits 206b which each define an elongate space 208b. Each steel fluid conduit 206b may, for example, be a conductor or a riser or the like and may contain pressurized fluids at pressures of up to 5,000 PSI or more. Each steel fluid conduit 206b may permit fluids to flow therethrough between the deck 201 and the seabed 205 and/or may allow objects such as drill strings, tool strings, production tubing or the like to pass therethrough between the deck 201 and the seabed 205.

The platform 202 includes a plurality of the apparatus 10, each apparatus 10 being configured for monitoring the corresponding elongate space 208a defined within the corresponding structural steel tubular member 206a. Each apparatus 10 may be located at or adjacent one end of, or part way along, the corresponding elongate space 208a defined within the corresponding structural steel tubular member 206a. Fore example, each apparatus 10 may be located within the corresponding elongate space 208a at or adjacent a critical feature such as a junction with one or more of the other structural steel tubular members 206a, or a load point or the like for the purposes of monitoring the critical feature. Each apparatus 10 may permit a non-uniformity or discontinuity in cross-section of the corresponding elongate space 208a defined within the corresponding structural steel tubular member 206a to be detected and/or monitored. Each apparatus 10 may permit any corrosion of an inner surface of the corresponding structural steel tubular member 206a to be detected and/or monitored.

The platform 202 further includes a plurality of apparatus 210, each apparatus 210 being installed in, or incorporated into, an upper end 212b of a corresponding elongate space 208b defined within a different fluid conduit 206b. Each apparatus 210 is configured for monitoring the corresponding elongate space 208b. In particular, each apparatus 210 is used to monitor a position of an interface between two different fluids within the elongate space 208b as will be described in more detail with reference to FIG. 4.

Figure 4:
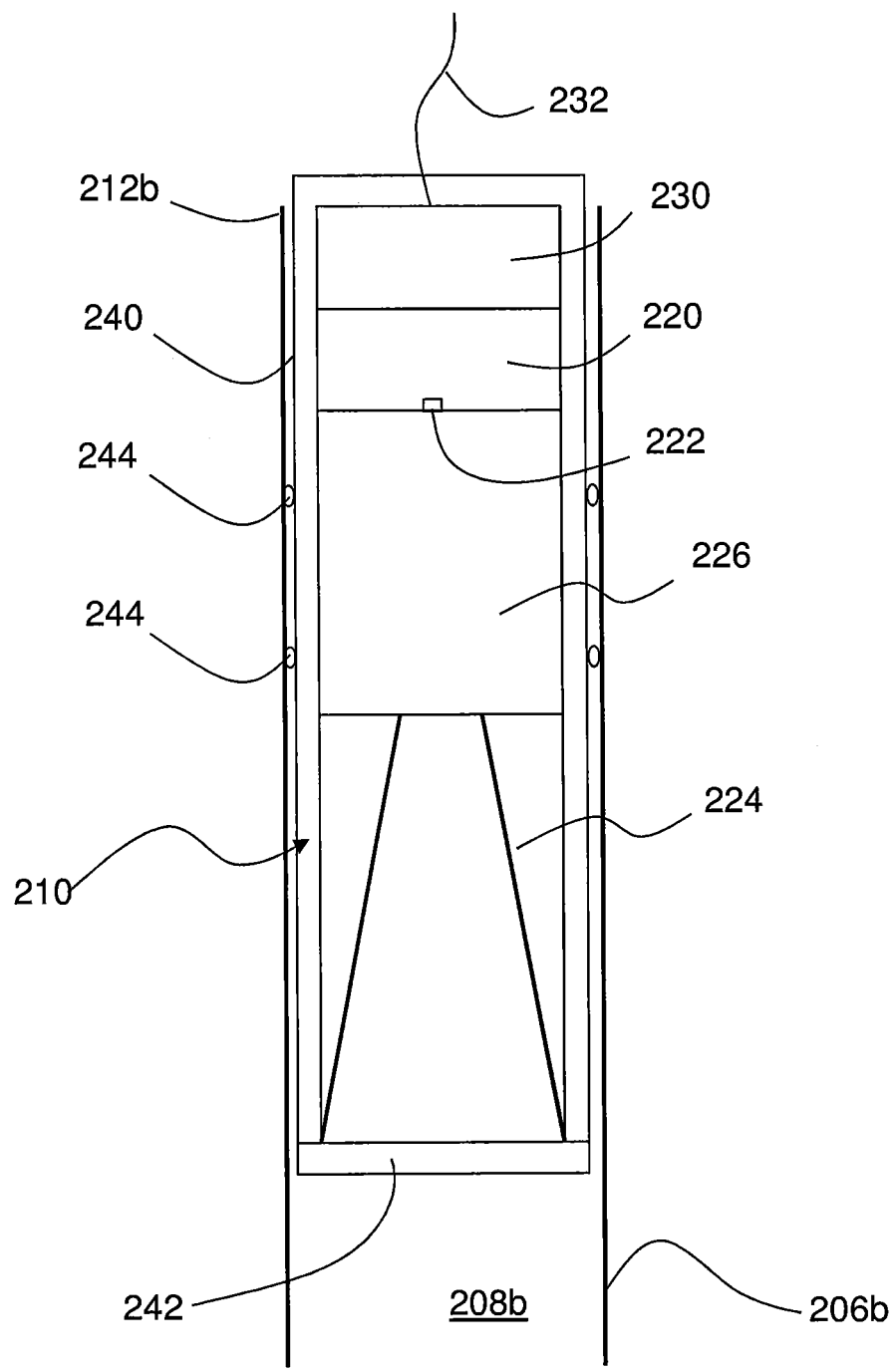
FIG. 4 is a schematic of an upper end region of one of the elongate spaces defined by the offshore platform of FIG. 3 showing an apparatus for monitoring the elongate space installed in the upper end region of the elongate space.

FIG. 4 shows the upper end 212b of one of the elongate spaces 208b and one of the apparatus 210 installed therein. The apparatus 210 shares many like features with the apparatus 10 of FIG. 2. The reference numeral of a like feature of the apparatus 210 is equal to the reference numeral of the corresponding feature of FIG. 2 incremented by "200". The apparatus 210 includes a signal generator and detector arrangement in the form of a VNA 220 having a port 222. The apparatus 210 includes a horn antenna 224, a transition 226 and a controller 230. The transition 226 couples the port 222 of the VNA 220 to the antenna 224. Unlike the apparatus 10, the apparatus 210 includes an enclosure 240 which houses the VNA 220, the horn antenna 224, the transition 226 and the controller 230. The enclosure 240 includes a window 242 at a lower end which is transparent to electromagnetic signals in the frequency range 4 to 40 GHz. The apparatus 210 further includes O-ring seal members 244 for sealingly engaging an inner surface of the steel fluid conduit 206b so as to prevent the escape of fluids upwardly from the elongate space 208b past the apparatus 210. As such, the apparatus 210 seals the elongate space 208b and permits pressurisation of the elongate space 208b. The apparatus 210 may be configured to receive electrical power from the power supply 207 shown in FIG. 3 and/or to communicate with the control room 209 shown in FIG. 3 via a cable 232.

In use, each apparatus 210 monitors the position of an interface between two different fluids in the corresponding fluid conduit 206b in much the same way as all ready described in relation to the operation of the apparatus 10 with reference to FIGS. 1 and 2. In particular, each apparatus 210 monitors the position of an air-oil interface, an oil-water interface and/or an air-water interface in the corresponding fluid conduit 206b during subsea wellbore operations. The controller 230 may communicate the position of an interface between two different fluids to the control room 209 where an operator can take any necessary action such as any necessary remedial action in response to the detected position of the interface between the two different fluids, if it is necessary for fluid to flow through an elongate space 208b and/or if it is necessary for an object such as a drill string, a tool string, production tubing or the like to pass or extend through, the elongate space 208b, the corresponding apparatus 210 may be removed. Alternatively, each apparatus 210 may be permanently installed within the elongate space 208b.

Figure 5:
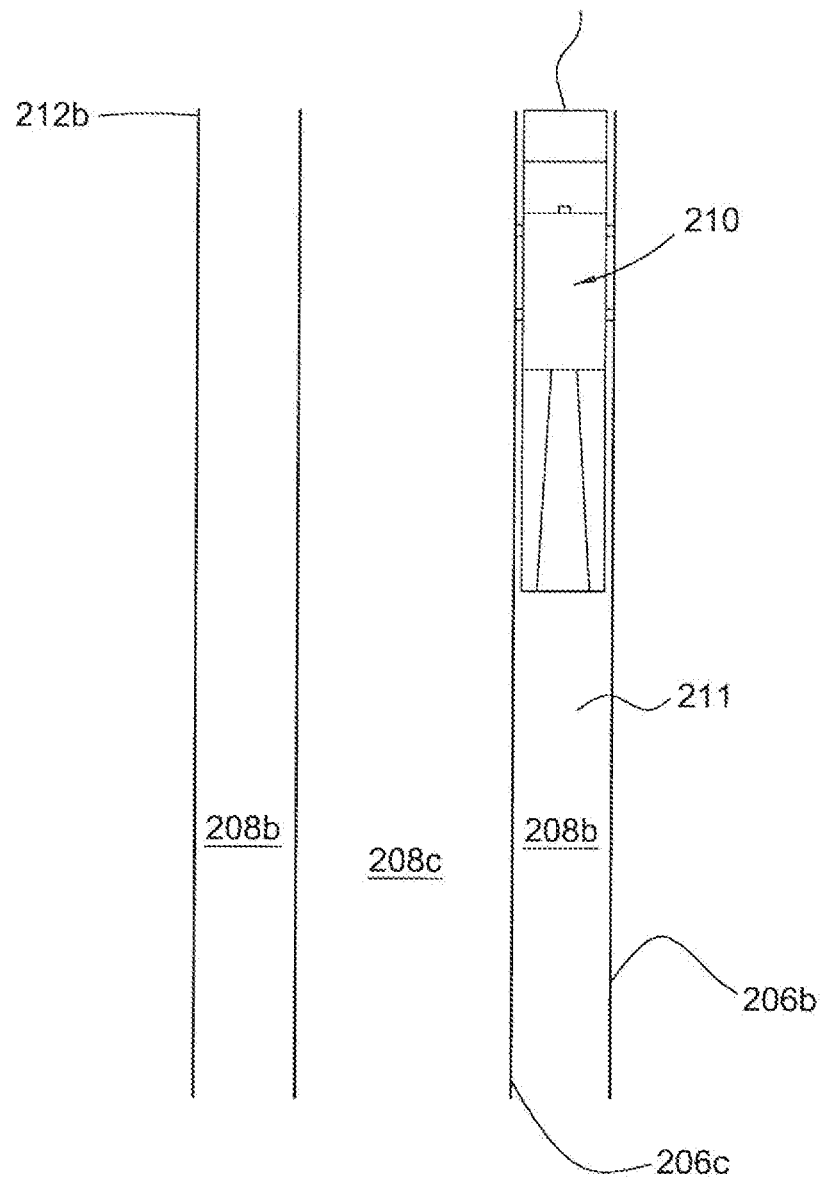
FIG. 5 is a schematic of an upper end region of an annular elongate space defined by the offshore platform of FIG. 3 showing the apparatus of FIG. 4 installed in the upper end region of the annular elongate space.

FIG. 5 shows an, alternative installation of the apparatus 210 in an upper end 212b of one of the elongate spaces 208b in an annulus 211 defined between an inner surface of the corresponding fluid conduit 206b and an outer surface of a corresponding inner tubular 206c. In the alternative installation of the apparatus 210 of FIG. 5, the inner tubular 206c defines an elongate space 206c internally thereof which is neither obstructed nor constricted by the apparatus 210 and which may provide a path for the flow of fluid and/or may allow an object such as a drill string, a tool string or production tubing or the like to move or extend through the elongate space 206c.

Figure 6:
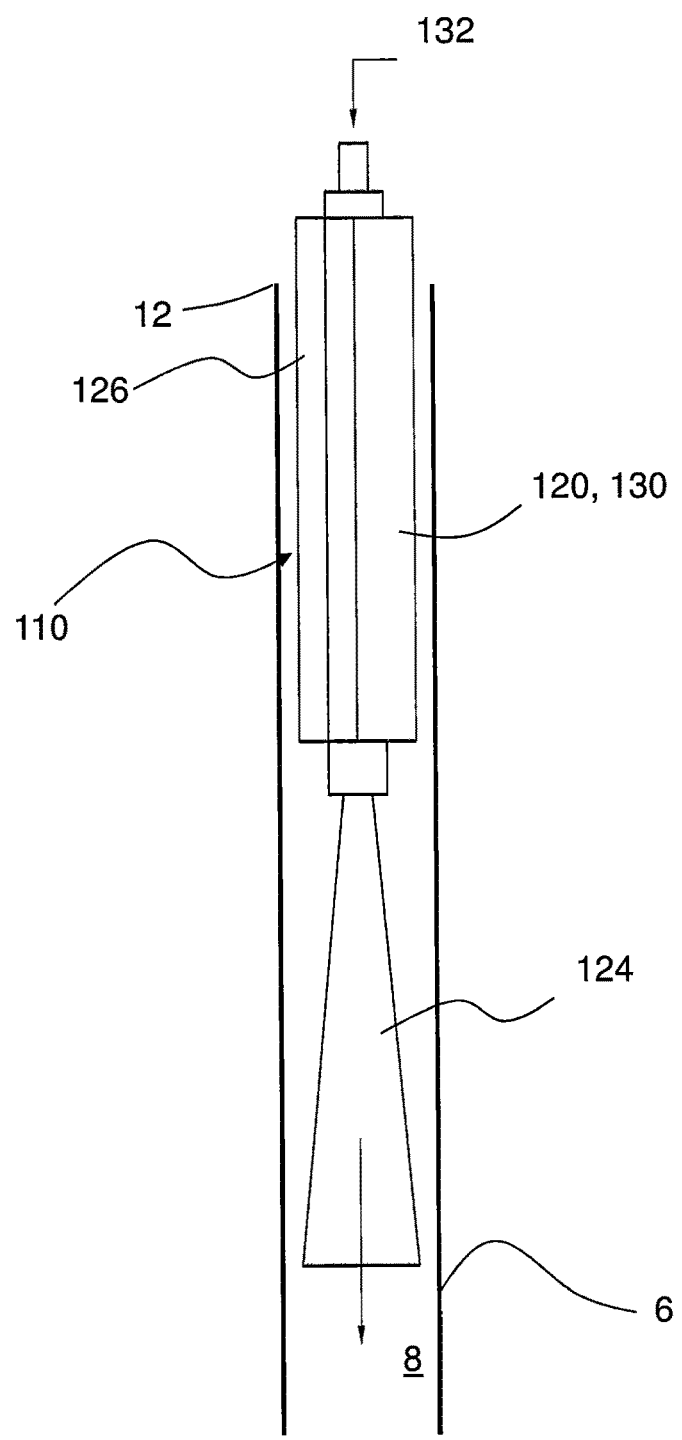
FIG. 6 is a schematic of an upper end region of an elongate space defined by a structure including a first alternative apparatus for monitoring the elongate space.

FIG. 6 shows a first alternative apparatus 110 located within the upper end 12 of the elongate space 8 for monitoring the elongate space 8. The apparatus 110 shares many like features with the apparatus 10 of FIG. 2. The reference numeral of a like feature of the apparatus 110 is equal to the reference numeral of the corresponding, feature of FIG. 2 incremented by "100". The apparatus 110 includes a signal generator and detector arrangement in the form of a VNA 120. The apparatus 110 includes a horn antenna 124, a transition 126 and a controller 130. The transition 126 couples the VNA 120 to the antenna 124. The VNA 120, the horn antenna 124, the transition 126 and the controller 130 are integrated together to form a rigid body. The apparatus 110 may receive electrical power from a power supply (not shown) and/or communicate with an operator (not shown) via a cable 132. The apparatus 110 only differs from the apparatus 10 in the side-by-side arrangement of the VNA 120 and the transition 126.

One of ordinary skill in the art will appreciate that the apparatus 110 may be adapted for monitoring other elongate spaces other than the elongate space 8. For example, the apparatus 110 may be adapted to monitor the elongate space 208a defined within a structural steel tubular member 206a of the offshore platform 202 of FIG. 3 or the apparatus 110 may be adapted to monitor the elongate space 208b defined within a fluid conduit 206b of the offshore platform 202 of FIG. 3. The apparatus 110 may include an enclosure (not shown) like the enclosure 240 of the apparatus 210 which includes a window (not shown) like the window 242 of the apparatus 210 at a lower end, which window is transparent to electromagnetic signals in the frequency range 4 to 40 GHz. The apparatus 110 may further include one or more seal members (not shown) like the seal members 244 of the apparatus 210, which seal members are mounted on an outer surface of the apparatus 110 for sealingly engaging one or more surfaces which define the elongate space so as to prevent a fluid from flowing in the elongate space past the apparatus 110.

Figure 7:
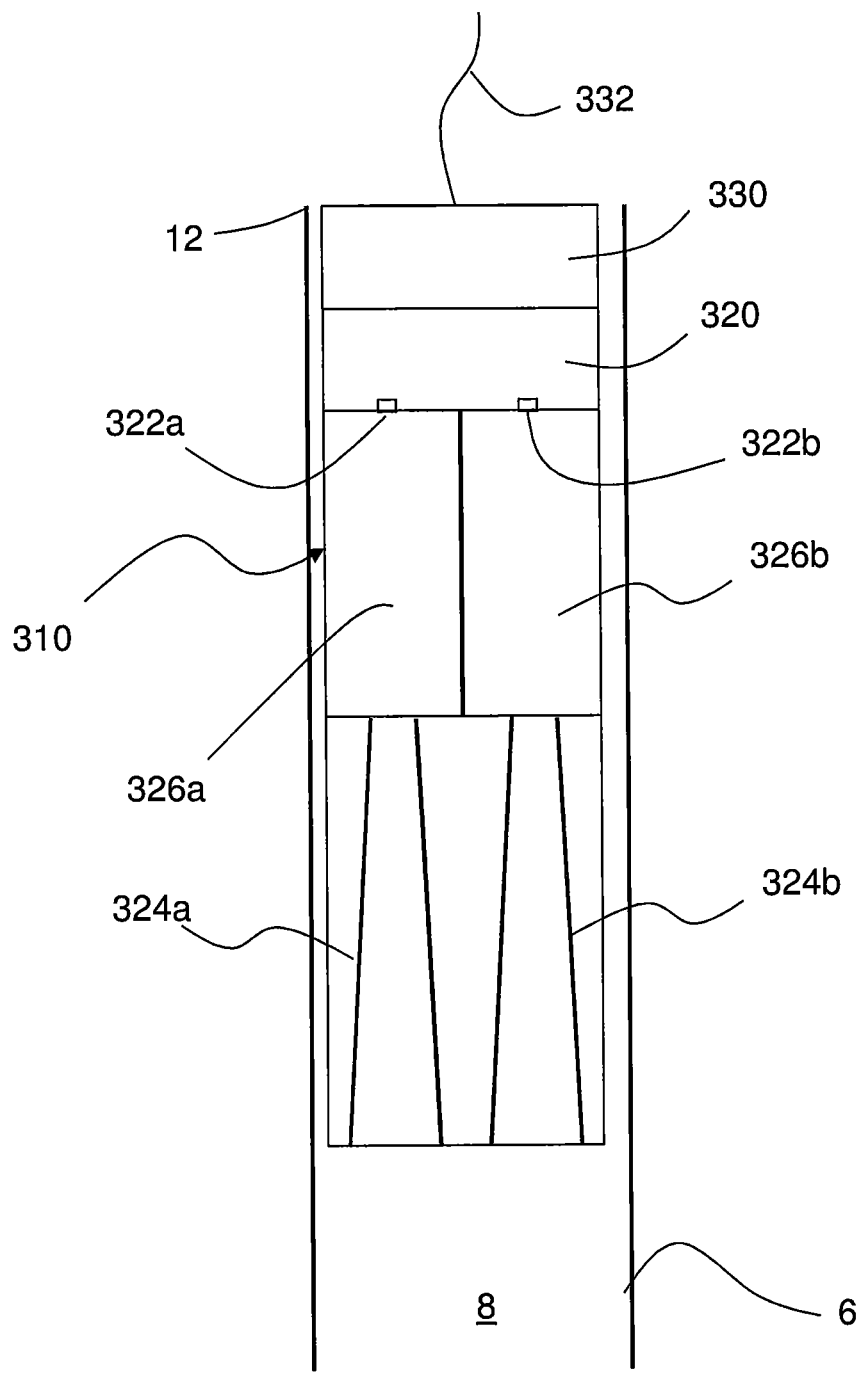
FIG. 7 is a schematic of an upper end region of an elongate space defined by a structure including a second alternative apparatus for monitoring the elongate space.

FIG. 7 shows a second alternative apparatus 310 located within the upper end 12 of the elongate space 8 for monitoring the elongate space 8. The apparatus 310 shares many like features with the apparatus 10 of FIG. 2. The reference numeral of a like feature of the apparatus 310 is equal to the reference numeral of the corresponding feature of FIG. 2 incremented by "300". The apparatus 310 includes a signal generator and detector arrangement in the form of a VNA 320 having a first, port 322a and a second port 322b. The apparatus 310 includes a transmitter antenna 324a and a receiver antenna 324b. The apparatus 310 includes a first transition 326a which couples the first port 322a of the VNA 320 to the transmitter antenna 324a and a second transition 326b which couples the second port 322b of the VNA 320 to the receiver antenna 324b. The apparatus 310 further includes a controller 330. The VNA 320, the horn antennas 324a, 324b, the transitions 326a, 326b, and the controller 330 are integrated together to form a rigid body. The apparatus 310 may receive electrical power from a power supply (not shown) and/or communicate with an operator (not shown) via a cable 332.

One of ordinary skill in the art will appreciate that the apparatus 310 functions in a similar manner to the apparatus 10 except that, instead of the VNA. 320 determining a magnitude frequency spectrum and a phase frequency spectrum from the measured magnitudes and phases of signals transmitted and received via the same port, the VNA 320 determines a magnitude frequency spectrum and a phase frequency spectrum from the measured magnitudes and phases of signals transmitted via the first port 322a and the measured magnitudes and phases of signals received via the second port 322b. The use of separate transmitter and receiver antennas 324a, 324b allows the antennas 324a, 324b to be positioned independently and may improve the signal to noise ratio.

One of ordinary skill in the art will appreciate that other modifications of the apparatus 310 are also possible. For example, one of ordinary skill in the art will appreciate that the apparatus 310 may be adapted for monitoring other elongate spaces other than the elongate space 8 defined by the steel tubular member 6 within the dam 2. For example, the apparatus 310 may be adapted to monitor the elongate space 208a defined within a structural steel tubular member 206a of the offshore platform 202 of FIG. 4 or the apparatus 310 may be adapted to monitor the elongate space 208b defined within a fluid conduit 206b of the offshore platform 202 of FIG. 4. The apparatus 310 may include an enclosure (not shown) like the enclosure 240 of the apparatus 210 which includes a window (not shown) like the window 242 of the apparatus 210 at a lower end, which window is transparent to electromagnetic signals in the frequency range 4 to 40 GHz. The apparatus 310 may further include one or more seal members (not shown) like the seal members 244 of the apparatus 210, which seal members are mounted on an outer surface of the apparatus 310 for sealingly engaging one or more surfaces which define the elongate space so as to prevent a fluid from flowing in the elongate space past the apparatus 310. Both of the transmitter and receiver antennas 324a, 324b may be located in an annular elongate space such as the annular elongate space 208b shown in FIG. 5. One of the transmitter and receiver antennas 324a, 324b may be located in an annular elongate space such as the annular elongate space 208b shown in FIG. 5, whilst the other of the transmitter and receiver antennas 324b, 324a may be located in an elongate space surrounded by the annular elongate space 208b, such as the elongate space 208c defined by the inner tubular 206c shown in FIG. 5.

Figure 8:
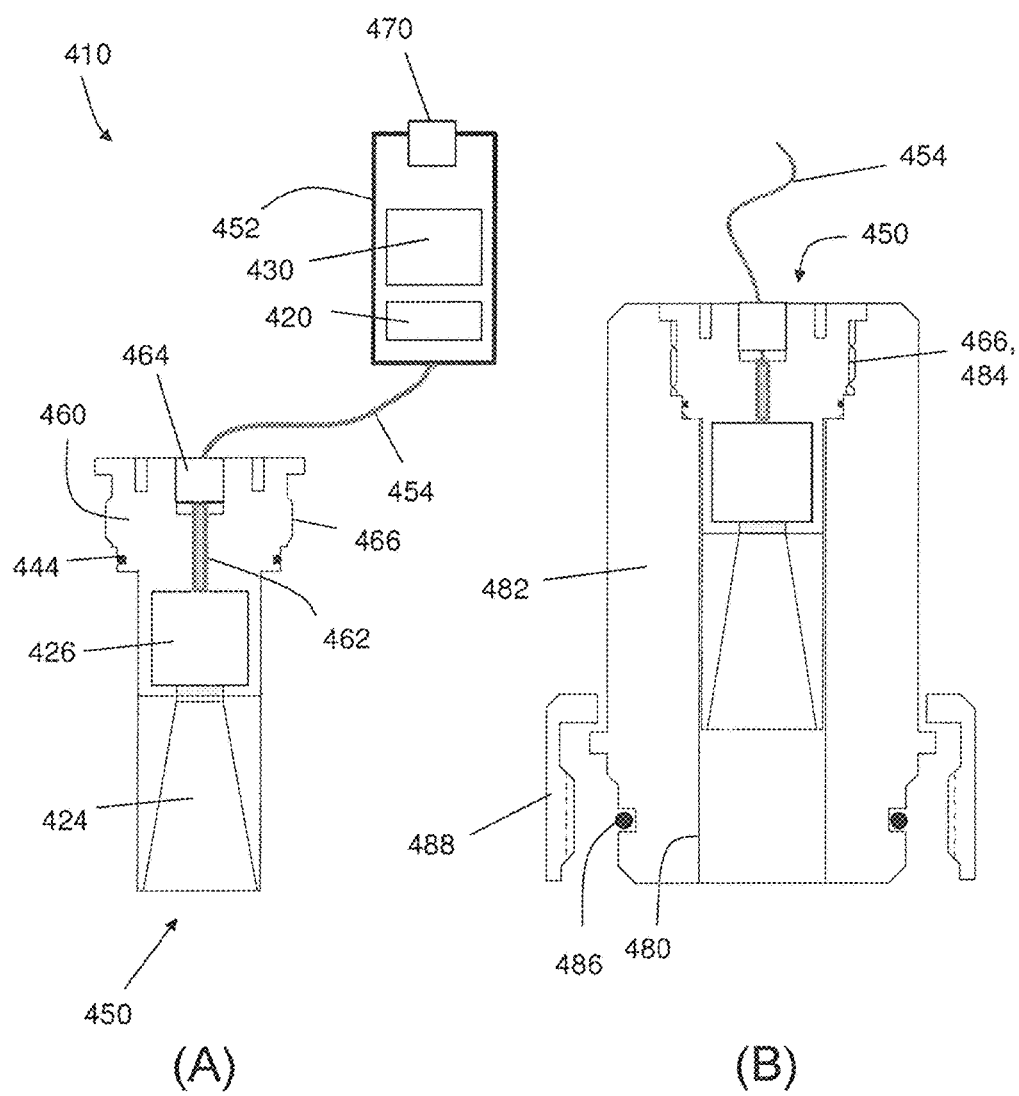
FIG. 8 Panel (A) is a schematic cross-section of a third alternative apparatus for monitoring an elongate space defined by a structure, the third alternative apparatus including a sensor head arrangement connected electrically to separate sensor electronics. Panel (B) is a schematic cross-section of the sensor head arrangement of the third alternative apparatus of FIG. 8, Panel (a) fixed within a bore of a cap member for sealing the elongate space to be monitored.

FIG. 8, Panel (A) shows a third alternative apparatus generally designated 410 for monitoring an elongate space. The apparatus 410 shares many like features with the apparatus 10 of FIG. 2. The reference numeral of a like feature of the apparatus 410 is equal to the reference numeral of the corresponding feature of FIG. 2 incremented by "400". The apparatus 410 includes a sensor head arrangement generally designated 450, separate sensor electronics generally designated 452, and a semi-rigid coaxial cable 454 which connects the sensor head arrangement 450 and the sensor electronics 452 for the transfer of electromagnetic signals therebetween. Providing the sensor electronics 452 separately from the sensor head arrangement 450 may allow the sensor electronics 452 to be located separately or remotely from the elongate space. This may be advantageous where the environmental conditions within the elongate space would be detrimental to the operation of the sensor electronics 452. For example, this may be advantageous where the temperature within the elongate space would be detrimental to the operation of the sensor electronics 452.

The sensor head arrangement 450 includes a body 460, a horn antenna 424, a waveguide 462, and a transition in the form of a mode converter 426 for converting an electromagnetic mode associated with the waveguide 462 to an electromagnetic mode associated with the horn antenna 424 or vice versa. The body 460 defines a screw thread 466 on an outer surface thereof for coupling with a complementary internal thread. The waveguide 462 is coupled to one end of the cable 454. The sensor head arrangement 450 further includes a cable seal member 464 for sealing the cable 454 relative to the body 460 and an O-ring seal 444 for sealing the body 460 relative to the elongate space (not shown) in which the sensor head arrangement 450 is to be located.

It should be understood that the sensor head arrangement 450 is modular. Specifically, the body 460 and the horn antenna 424 are detachably attached such that the horn antenna 424 is interchangeable with other horn antennas (not shown) according to the particular configuration of the elongate space to be monitored. Similarly, the mode converter 426 is accessible for replacement by an alternative mode converter according to the particular configuration of the horn antenna 424 and/or the waveguide 462.

The sensor electronics 452 include a signal generator and detector arrangement in the form of a VNA 420 having a port 422 coupled to the other end of the cable 454. The sensor electronics 452 further include a controller 430, and a power and Ethernet connector 470. The power and Ethernet connector 470 may be power and Ethernet connector 470 for use in an explosive environment. For example, the power and Ethernet connector 476 may be compatible or compliant with an ATEX directive.

FIG. 8, Panel (B) shows the sensor head arrangement 450 of FIG. 8, Panel (A) fixed within a bore 480 defined by a cap member 482 for sealing the elongate space to be monitored. The screw thread 466 defined on the outer surface of the body 460 is coupled with an internal thread 484 defined by the cap member 482. The cap member 482 further includes an O-ring seal member 486. In use, the cap member 482 is fixed or locked to a structure (not shown) such as a wellhead of an oil or gas well or the like using a locking member 488 such that the O-ring seal member 486 forms a seal with the structure (not shown) and the body 460 of the sensor head arrangement 450 is sealed relative to the bore 480 defined by the cap member 482 by the O-ring seal 444 so as to seal an upper end of an elongate space (not shown) defined by the structure (not shown). The O-ring seal 444 and the cable seal member 464 then act to seal the end of the elongate space such that the horn antenna 424, the mode converter 426 and the waveguide 462 are all exposed to at least some of the effects of the environment within the elongate space and the sensor electronics 452 are isolated from the effects of the environment within the elongate space. Specifically, the sensor electronics 452 are isolated from the temperature of the environment within the elongate space. The apparatus 410 may be operated to monitor an elongate space in an identical manner to that already described above in relation to apparatus 10.

In a variant of the apparatus 410, the waveguide 462 may be omitted and the semi-rigid coaxial cable 454 may extend from the sensor electronics 452 directly to the mode converter 426.

Figure 9:
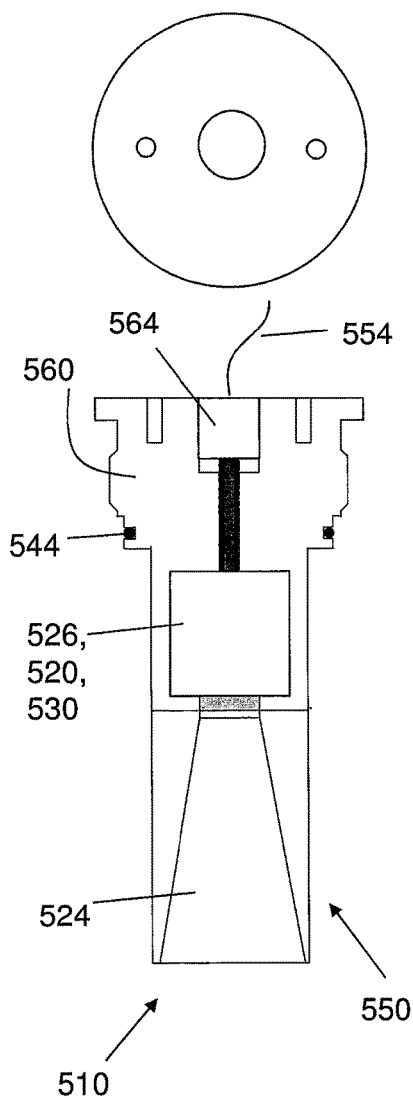
FIG. 9 is a schematic cross-section of a fourth alternative apparatus for monitoring an elongate space defined by a structure, the fourth alternative apparatus including embedded sensor electronics, a mode convertor and an antenna horn.

FIG. 9 is a schematic cross-section of a fourth alternative apparatus generally designated 510 for monitoring an elongate space defined by a structure. The apparatus 510 shares many like features with the apparatus 10 of FIG. 2. The reference numeral of a like feature of the apparatus 510 is equal to the reference numeral of the corresponding feature of FIG. 2 incremented by "500". Like the apparatus 410 of FIGS. 8(a) and 8(b), the apparatus 510 of FIG. 9 includes a sensor head arrangement 550 which includes a body 560 and a horn antenna 524, and a transition in the form of a mode converter 526. However, unlike the sensor head arrangement 450 of the apparatus 410 of FIGS. 8(a) and 8(b), the sensor head arrangement 550 also includes a signal generator and detector arrangement in the form of a VNA 520 and a controller 530. The sensor head arrangement 550 further includes cable seal member 564 for sealing a cable 570 relative to the body 560 and an O-ring seal 544 for sealing the body 560 relative to the elongate space (not shown) in which the sensor head arrangement 550 is to be located in use, the cable 570 provides power and an Ethernet connection to the sensor head arrangement 550. In use, the O-ring seal 544 and the cable seal member 564 together seal the end of the elongate space such that the horn antenna 524, the mode converter 526, the VNA 520 and the controller 530 may be exposed to at least some of the effects of the environment within the elongate space. The apparatus 510 may be operated to monitor an elongate space in an identical manner to that already described above in relation to apparatus 10.

Figure 10:
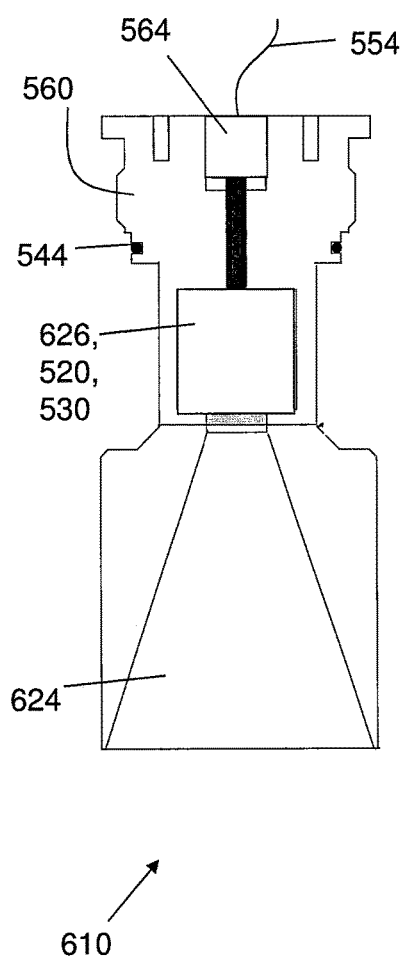
FIG. 10 is a schematic cross-section of the sensor head arrangement of a fifth alternative apparatus for monitoring an elongate space defined by a structure, the fifth alternative apparatus including embedded sensor electronics, a mode convertor and an antenna horn.

It should be understood that the sensor head arrangement 550 is modular. Specifically, the body 560 and the horn antenna 524 are detachably attached such that the horn antenna 624 is interchangeable with an alternative horn antenna 624 shown in FIG. 10 according to the particular configuration of the elongate space to be monitored. Similarly, the mode converter 526 is accessible for replacement by an alternative mode converter 626 shown in FIG. 10 according to the particular configuration of the horn antenna 624 so as to permit the assembly of the alternative apparatus generally designated 610 for monitoring an elongate space defined by a structure.

One of ordinary skill in the art will also appreciate that modifications of the apparatus 10, 110, 210, 310, 410, 510, 610 are possible. For example, the apparatus may be incorporated into the structure and/or embedded in the structure. The apparatus may be located at least partially within the elongate space. The apparatus may be located wholly within the elongate space. The structure may comprise a tubular member, wherein the tubular member defines the elongate space. For example, the tubular member may comprise at least one of a length of tubing, a liner, a hollow shaft, a conduit, a pipe, a pipeline, a conductor, a riser, a duct such as an air duct, a structural member, a support member, a pole, a leg, and a spar.

At least part of the structure may be configured for use above ground. For example, the structure may comprise at least one of a building, a bridge, a dam, a pylon, a platform, a rig, an installation, a mast, and a tower. The structure may comprise a power station such as a nuclear power station.

The structure may be configured for use in a well for producing a hydrocarbon fluid or for use in a well for injecting water. The structure may comprise a wellhead or a Christmas tree. At least part of the structure may be configured for use downhole.

At least part of the structure may be configured for use subsea. The structure may be semi-submersible. The structure may comprise at least one of an offshore installation, an offshore rig, and an offshore platform. The structure may comprise a conductor or a riser.

The structure may be configured to float on water. The structure may comprise a vessel or a ship.

The elongate space may be defined by an electrically conductive material of any kind. The elongate space may be defined by a metal of any kind.

The elongate space may have a uniform cross-section having a shape of any kind. The elongate space may have a circular cross-section. The elongate space may have an annular cross-section. The elongate space may have a rectangular cross-section. The elongate space may have a square cross-section.

The elongate space may be sealed.

The elongate space may be exposed to a pressure of an environment external to the elongate space.

The apparatus may be configured for use in a high pressure environment.

The apparatus may be configured for use in pressures of up to 1,000 PSI, pressures of up to 3,000 PSI, pressures of up to 5,000 PSI, pressures of up to 10,000 PSI, and/or pressures of up to 15,000 PSI.

The apparatus may be configured to transmit an electromagnetic mode other than a $TE_{01}$ mode. For example, the apparatus may be configured to transmit any electromagnetic mode which minimises transmission loss within the particular elongate space which is to be monitored and which maximises the sensitivity and/or range of measurements performed using the apparatus. The electromagnetic mode may be circular. The electromagnetic mode may comprise a TE electromagnetic mode. The electromagnetic mode may comprise a $TE_{0n}$ electromagnetic mode, where $n \neq 1$.

Rather than using a VNA, any microwave signal generator and detector arrangement may be used.

In addition to, or as an alternative to, using an FDR technique, the apparatus may use a Frequency-modulated Continuous Wave (FMCW) technique or a Frequency-modulated Interrupted Continuous Wave (FMiCW) technique to determine the distance between the apparatus and the feature within the elongate space.

The method may comprise using an FDR method and then using an FMCW method or an FMiCW method to determine a distance to a feature within the elongate space.

The method may comprise using a VNA to implement the FDR method and then using an FMCW signal generator and detector arrangement to implement the FMCW method or using an FMiCW signal generator and detector arrangement to implement the FMiCW method.

It will be appreciated that the apparatus which may comprise various components, e.g. body and/or enclosure and/or signal generator and/or detector, may be of a modular design. This may allow one or more of the components to be swapped or changed out, e.g. to suit measurement requirements.

The invention claimed is:

1. A structure defining an elongate space, the structure comprising an apparatus installed at least partially within the elongate space, wherein the apparatus comprises:
    a signal generator and detector arrangement comprising a Vector Network Analyser (VNA);
    at least one antenna; and
    at least one transition for coupling the signal generator and detector arrangement and the antenna,
    wherein the at least one antenna is coupled to the elongate space for transmitting an electromagnetic signal into the elongate space and for receiving the electromagnetic signal from the elongate space after reflection of the electromagnetic signal from a feature within the elongate space.

2. A structure according to claim 1, wherein the at least one antenna is coupled to the elongate space for transmitting an electromagnetic signal through the elongate space and for receiving the electromagnetic signal from the elongate space after reflection of the electromagnetic signal from the feature within the elongate space.

3. A structure according to claim 1, wherein the at least one antenna is coupled to the elongate space for transmitting an electromagnetic signal axially along the elongate space and for receiving the electromagnetic signal axially from the elongate space after reflection of the electromagnetic signal from the feature within the elongate space.

4. A structure according to claim 1, wherein the feature comprises at least one of:
an interface between two different fluids;
a non-uniformity or a discontinuity in cross-section of the elongate space;
an object;
particulates;
an obstruction, impairment, restriction, or occlusion of the elongate space;
a non-uniformity or discontinuity in a property of a surface of the structure which defines the elongate space;
a non-uniformity or discontinuity in roughness or electrical conductivity of the surface of the structure which defines the elongate space;
a deposit formed on a surface of the structure which defines the elongate space; and
corrosion of a surface of the structure which defines the elongate space.

5. A structure according to claim 1, wherein the feature is spatially distributed within the elongate space.

6. A structure according to claim 1, wherein the apparatus is incorporated into the structure, embedded in the structure, and/or is permanently installed within the structure.

7. A structure according to claim 1, wherein the apparatus is located wholly within the elongate space.

8. A structure according to claim 1, wherein the apparatus is located at or adjacent to one end of the elongate space.

9. A structure according to claim 1, comprising a tubular member, wherein the tubular member defines the elongate space.

10. A structure according to claim 9, wherein the tubular member comprises at least one of a length of tubing, a liner, a hollow shaft, a conduit, a pipe, a length of casing, a pipeline, a conductor, a riser, a duct, an air duct, a structural member, a support member, a pole, a leg, and a spar.

11. A structure according to claim 1, wherein at least part of the structure is configured for use above ground, for use downhole, or for use subsea, or wherein at least part of the structure is configured to float on water.

12. A structure according to claim 1, comprising at least one of a building, a bridge, a dam, a pylon, a platform, a rig, an installation, a mast, a tower, a power station, a nuclear power station, an offshore installation, an offshore rig, an offshore platform, a vessel and a ship.

13. A structure according to claim 1, wherein the structure comprises or defines at least part of a well for producing a hydrocarbon fluid or for injecting water.

14. A structure according to claim 1, wherein the at least one antenna is located at or adjacent to one end of a well for producing a hydrocarbon fluid or for injecting water.

15. A structure according to claim 1, wherein the at least one antenna is located at or adjacent to a surface of the ground or a surface of the seabed.

16. A structure according to claim 1, wherein the structure comprises a wellhead or a Christmas tree.

17. A structure according to claim 1, wherein the elongate space is defined by at least one of an electrically conductive material, a metal and steel.

18. A structure according to claim 1, wherein the elongate space has at least one of a circular cross-section, an annular cross-section, a rectangular cross-section, and a square cross-section.

19. A structure according to claim 1, wherein the elongate space is sealed from an environment external to the elongate space.

20. A structure according to claim 1, wherein the elongate space is exposed to pressures of up to 1,000 PSI, pressures of up to 3,000 PSI, pressures of up to 5,000 PSI, pressures of up to 10,000 PSI, and/or pressures of up to 15,000 PSI.

21. A structure according to claim 1, wherein the signal generator and detector arrangement comprises a signal generator and a signal detector.

22. A structure according to claim 1, wherein the signal generator and detector arrangement is configured to generate and detect signals having a frequency in a frequency range of 1 GHz to 100 GHz, 2 GHz to 50 GHz, 4 GHz to 40 GHz, or 20 to 60 GHz or up to 75 GHz.

23. A structure according to claim 1, wherein the at least one antenna is detachably attached to the at least one transition.

24. A structure according to claim 1, wherein the signal generator and detector arrangement is provided with the at least one antenna and/or the at least one transition.

25. A structure according to claim 1, wherein the at least one antenna and/or the at least one transition are detachably attached to the signal generator and detector arrangement.

26. A structure according to claim 1, wherein the signal generator and detector arrangement is provided separately from the at least one antenna and/or the at least one transition.

27. A structure according to claim 1, wherein the apparatus comprises a body or an enclosure.

28. A structure according to claim 27, wherein the body or the enclosure houses the at least one antenna and/or the at least one transition.

29. A structure according to claim 27, wherein the at least one antenna and/or the at least one transition are defined by the body or the enclosure.

30. A structure according to claim 27, wherein the at least one antenna and/or the at least one transition are detachably attached to the body or the enclosure.

31. A structure according to claim 27, wherein the body or the enclosure houses the signal generator and detector arrangement.

32. A structure according to claim 27, wherein the signal generator and detector arrangement is provided separately from the body or the enclosure and/or is located outside the body or the enclosure.

33. A structure according to claim 1, wherein a waveguide mode at the signal generator and detector arrangement comprises at least one of a circular waveguide mode, a rectangular waveguide mode, a TE waveguide mode and a $TE_{10}$ waveguide mode, and wherein an electromagnetic mode at each of the at least one antennas comprises at least one of a circular electromagnetic mode, a rectangular electromagnetic mode, a TE electromagnetic mode, a $TE_{0n}$ electromagnetic mode, and a $TE_{01}$ electromagnetic mode.

34. A structure according to claim 1, wherein the at least one antenna comprises a single antenna.

35. A structure according to claim 34, wherein the at least one transition comprises a single transition which is configured to convert between a waveguide mode at the signal generator and detector arrangement and an electromagnetic mode at the single antenna.

36. A structure according to claim 1, wherein the at least one antenna comprises a transmitter antenna for transmitting the electromagnetic signal into the elongate space and a receiver antenna for receiving the electromagnetic signal from the elongate space after reflection of the electromagnetic signal from the feature within the elongate space.

37. A structure according to claim 36, wherein the at least one transition comprises a first transition and a second transition, wherein the first transition is configured to convert between an electromagnetic mode at the transmitter antenna and a waveguide mode at a first port of the signal generator and detector arrangement, and wherein the second transition is configured to convert between an electromagnetic mode at the receiver antenna and a waveguide mode at a second port of the signal generator and detector arrangement.

38. A structure according to claim 1, wherein the structure defines a further elongate space, the at least one antenna comprises a transmitter antenna for transmitting an electromagnetic signal into the elongate space, and a receiver antenna for receiving the electromagnetic signal from the further elongate space after reflection of the electromagnetic signal from the feature located within the elongate space.

39. A structure according to claim 1, wherein the apparatus comprises a controller for controlling the signal generator and detector arrangement and which is configured to:
detect a feature within the elongate space from a signal generated by the signal generator and detector arrangement and a signal detected by the signal generator and detector arrangement;
determine a distance between the apparatus and the feature within the elongate space from the signals generated and detected by the signal generator and detector arrangement; and/or
determine a change in the distance between the apparatus and the feature from the signals generated and detected by the signal generator and detector arrangement over a period of time.

40. A method for use in monitoring a feature within an elongate space defined by a structure, the method comprising:
installing an apparatus at least partially within the elongate space, wherein the apparatus comprises a signal generator and detector arrangement comprising a Vector Network Analyser (VNA), at least one antenna, and at least one transition for coupling the signal generator and detector arrangement and the antenna;
generating a signal using the signal generator and detector arrangement and coupling the generated signal to the at least one antenna so as to transmit an electromagnetic signal from the at least one antenna into the elongate space;
receiving the electromagnetic signal at the at least one antenna from the elongate space after reflection of the electromagnetic signal from a feature within the elongate space; and
detecting a signal received from the at least one antenna using the signal generator and detector arrangement.

41. A method according to claim 40, comprising at least one of:
incorporating the apparatus into the structure;
embedding the apparatus in the structure;
locating the apparatus at least partially within the elongate space;
locating the apparatus wholly within the elongate space; and
locating the apparatus at or adjacent to one end of the elongate space.

42. A method according to claim 40, comprising determining a distance between the apparatus and the feature within the elongate space from the generated and detected signals.

43. A method according to claim 40, comprising determining a change of the distance between the apparatus and the feature within the elongate space from the generated and detected signals.

44. A method according to claim 40, wherein the electromagnetic signal has a frequency in a frequency range of 1 GHz to 100 GHz, 2 GHz to 50 GHz, 4 GHz to 40 GHz, or 20 to 60 GHz or up to 75 GHz.

45. A method according to claim 40, comprising using a Frequency Domain Reflectometry (FDR) technique to determine a distance between the apparatus and the feature within the elongate space.

46. A method according to claim 40, comprising sequentially varying a frequency of the generated signal.

47. A method according to claim 40, comprising generating the signal with at least 10 different frequencies, at least 100 different frequencies, at least 1,000 different frequencies, or at least 10,000 different frequencies.

48. A method according to claim 46, comprising altering the detected signals received for each of the different generated frequencies to correct or account for any differences in propagation speed of the electromagnetic signal in the elongate space at the different frequencies.

49. A method according to claim 40, comprising:
measuring a magnitude of the detected signal as a function of frequency;
measuring a phase of the detected signal as a function of frequency;
measuring a magnitude of the generated signal as a function of frequency;
measuring a phase of the generated signal as a function of frequency;
determining a magnitude frequency spectrum from the magnitude of the detected signal and the magnitude of the generated signal as a function of frequency; and
determining a phase frequency spectrum from the phase of the detected signal and the phase of the generated signal as a function of frequency.

50. A method according to claim 49, comprising using a Vector Network Analyser (VNA) to determine the magnitude frequency spectrum and the phase frequency spectrum.

51. A method according to claim 49, comprising determining a time domain reflectance trace from the magnitude frequency spectrum and the phase frequency spectrum.

52. A method according to claim 51, comprising determining a distance between the apparatus and a feature within the elongate space from the time domain reflectance trace.

53. A method according to claim 40, comprising determining a nature of the feature within the elongate space from a configuration of one or more reflectance features in at least one of the magnitude frequency spectrum, the phase frequency spectrum, and the time domain reflectance trace.

54. A method according to claim 40, comprising repeatedly and/or continuously sweeping the frequency of the transmitted electromagnetic signal through each frequency of a plurality of different frequencies.

55. A method according to claim 40, using a Frequency-modulated Continuous Wave (FMCW) technique or a Frequency-modulated Interrupted Continuous Wave (FMiCW) technique to determine a distance between the apparatus and the feature within the elongate space.

56. A method according to claim 40, comprising:
using an FDR technique to determine a distance between the apparatus and the feature within the elongate space; and then
using an FMCW technique to determine a distance between the apparatus and the feature within the elongate space.

57. A method according to claim 40, comprising repeatedly determining a distance between the apparatus and an interface between two different fluids so as to permit real-time or dynamic measurements of a level of the interface.

58. A method according to claim 57, comprising controlling a pump according to the determined distance between the apparatus and the interface.

59. A method according to claim 40, comprising detecting a signal at the apparatus after reflection of the transmitted electromagnetic signal from a plurality of features within the elongate space.

60. A method according to claim 59, wherein each feature comprises an interface between two different fluids.

61. An apparatus for at least partial installation within and monitoring of an elongate space, the apparatus comprising:
a signal generator and detector arrangement comprising a Vector Network Analyser (VNA);
an antenna; and
a transition for coupling the signal generator and detector arrangement and the antenna, wherein the transition is adapted to convert a waveguide mode at the signal generator and detector arrangement to an electromagnetic mode at the antenna,
wherein the signal generator and detector arrangement, the antenna and the transition are integrated together.

62. An apparatus according to claim 61, wherein the signal generator and detector arrangement comprises a signal generator and a signal detector.

63. An apparatus according to claim 61, wherein the apparatus comprises a body or an enclosure, and the signal generator and detector arrangement is housed within the body or the enclosure.

64. An apparatus according to claim 63, wherein the transition and/or the antenna are housed within the body or the enclosure and/or the apparatus is of a modular design.

65. An apparatus according to claim 63, wherein the transition and/or the antenna are detachably attached to the body or the enclosure.

* * * * *